United States Patent

[11] 3,631,273

| [72] | Inventor | Jesse J. Stein<br>115 Trinity Pl., Syracuse, N.Y. 13210 |
|---|---|---|
| [21] | Appl. No. | 866,091 |
| [22] | Filed | Oct. 6, 1969 |
| [45] | Patented | Dec. 28, 1971<br>Continuation of application Ser. No.<br>678,730, Oct. 27, 1969, now abandoned.<br>This application Oct. 6, 1969, Ser. No.<br>866,091 |

[54] DIRECT CURRENT ROTARY APPARATUS
6 Claims, 12 Drawing Figs.

[52] U.S. Cl. .................................................. 310/46,
310/72, 310/220, 310/231
[51] Int. Cl. .............................................. H02k 37/00
[50] Field of Search ........................................... 310/231,
232, 177, 233, 234, 237, 69, 128, 137, 145, 222,
151, 152, 154, 156, 181, 221, 185, 220, 269, 46,
49, 72; 318/138, 254

[56] References Cited
UNITED STATES PATENTS

| 307,387 | 10/1884 | Griscom .......................... | 310/46 |
| 2,450,809 | 10/1948 | Nader .............................. | 310/72 UX |

Primary Examiner—J. D. Miller
Assistant Examiner—R. Skudy
Attorney—F. P. Keiper

ABSTRACT: A direct current rotary apparatus including a four pole stator and a two pole rotor rotatable within said stator. The rotor having a commutator switch having two opposed arcuate segments and two sliprings each ring being connected to one of the switch segments and to the rotor winding. Four relatively stationary brushes angularly spaced uniformly about the segments, opposite pairs of brushes being connected to corresponding opposed stator, and coils the commutator having antishorting segments of brush width or greater disposed between the arcuate segments, and connected by a resistance.

PATENTED DEC 28 1971 3,631,273

INVENTOR.
JESSE J. STEIN.
BY
ATTORNEY

DIRECT CURRENT ROTARY APPARATUS

This is a continuation of U.S. Pat. application Ser. No. 678,730 filed Oct. 27, 1969, now abandoned.

This invention relates to electromotors and more particularly to direct current apparatus in which the power connections to the rotor require no commutation.

In direct current motors, it has been the common practice to provide a multipole armature rotating in a stationary field and to employ a commutator and brushes for conducting heavy currents to and from the armature. The present invention is directed to direct current apparatus wherein the rotor is connected to a source of direct current through sliprings, and in which the current necessary to energize the field or stator is commutated or switched whereby the field in effect rotates. Such commutation or switching may be rotated with the rotor.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 3A:
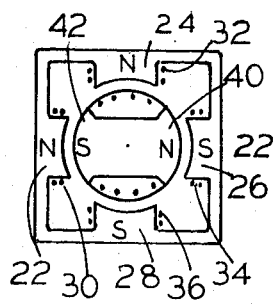
Figure 4A:
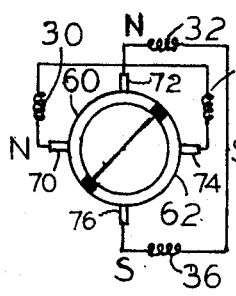
Figure 4B:
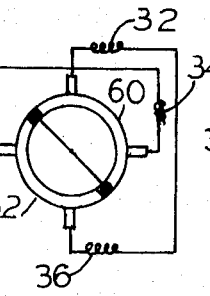
Figure 4C:
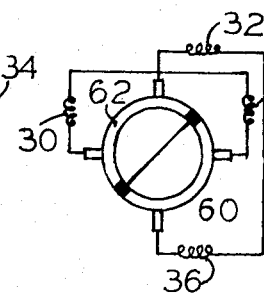
Figure 4D:
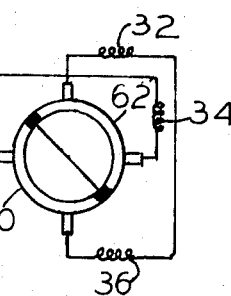
Figure 5:
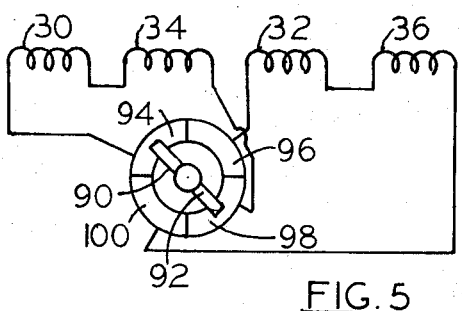

FIGS. 3A, B, C and D are schematic views of the successive positions taken by the rotor in response to field polarity changes;

FIGS. 4A, B, C and D are schematic views of the switching commutator in successive positions corresponding to the positions taken by the rotor in FIGS. 3A, B, C and D, and FIG. 5 is an alternative schematic arrangement wherein the brushes rotate in the switching device.

Figure 1A:
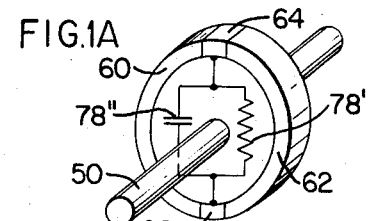
FIG. 1A is a fragmentary perspective view of an alternative commutator.
Figure 1:
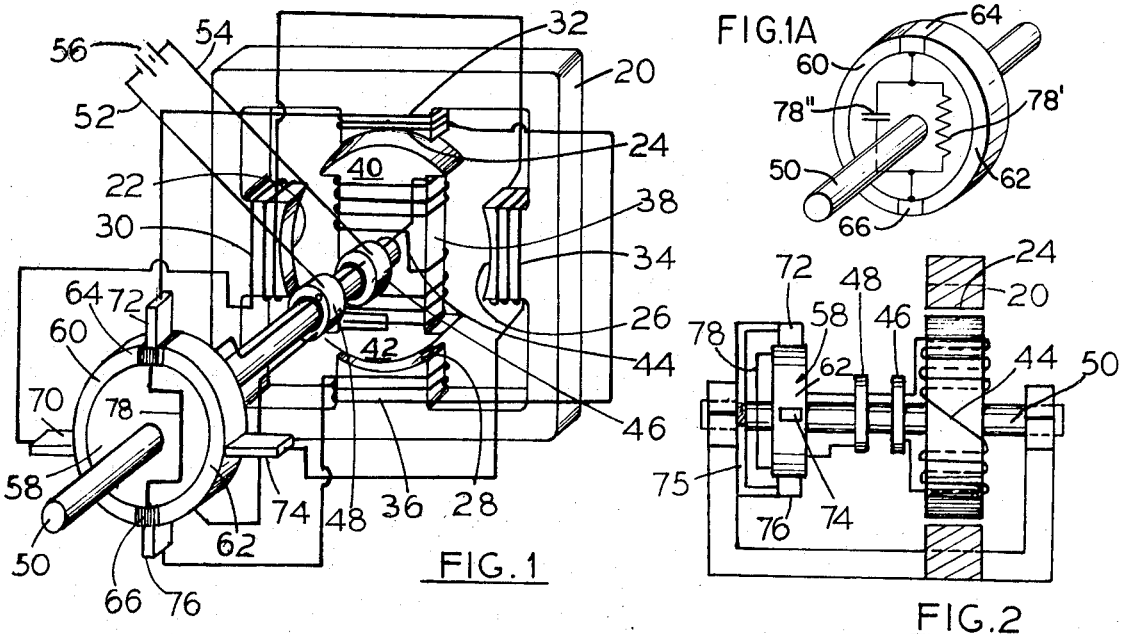
FIG. 1 is a perspective schematic illustration of the motor, sliprings and switching commutator.
Figure 2:
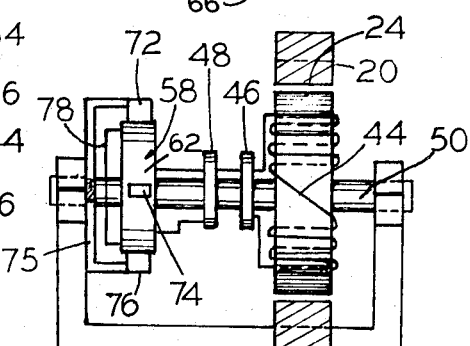
FIG. 2 is a schematic view of the rotor of the motor.

Referring to FIGS. 1 and 2 there is shown a stator 20 which may be made of soft iron laminations or other suitable magnetic circuit material. The stator has pole pieces 22, 24, 26 and 28 uniformly spaced angularly, and each having a winding as indicated at 30, 32, 34 and 36. Rotatably mounted for rotation within the stator is a two pole armature or rotor 38 having poles 40 and 42. A continuous winding 44 establishes one of the rotor poles as a north pole, which for further discussion may be pole 40, pole 42 thus being a south pole. Sliprings 46 and 48 are mounted on and insulated from the shaft 50, to which the rotor is fixed. Any suitable bearings for the shaft 50 are provided as will be understood in the art. Slipring contacts 52 and 54 are connected to a source of direct current indicated at 56.

Also affixed to the shaft 50 is a switching device 58 of the commutator type, the same comprising two like arcuate segments 60 and 62 of about 175° each, separated by insulation from each other, and intervening segments, 64 and 66, which latter segments are short in comparison to segments 60 and 62 are preferably of a width at least equal to the width of the relatively stationary contracting brushes 68, 70, 72 and 74. The brushes 68, 70, 72 and 74 are mounted in a brush holder normally stationary in respect to the rotor and indicated at 75. The brush holder may comprise a frame which may be rotated through a limited angle to vary the angular relation between the brushes and the field windings, the variation being limited to not greater than 45° in either direction, to provide an overall range of adjustment of not over 90°, for one direction of rotation. While the brush holder may be mounted for angular adjustment as described, it may also be fixed, and any adjustment necessary within the aforesaid angle can be effected by angularly setting the commutator switch 58 with respect to the rotor, to provide the same effect.

The intervening segments 64 and 66 are connected by a shunt 78. The segment 60 is connected to the slip ring 48, and the segment 62 is connected through the winding 44 to the slipring 46. The brushes 70 and 74 are connected in a first series connection to field coils 30 and 34 and the brushes 72 and 76 are connected in a second series connection to the field coils 32 and 36. The pair of field coils 30 and 34 are shown in series, as are the pair of field coils 32 and 36. The field coils of each pair could as well be connected in parallel depending on the current, voltage and the number of ampere turns desired.

With the rotor poles 40 and 42 disposed in the position shown in FIG. 3A, and the switching commutator segments in the position shown in FIG. 4A shifted slightly less than 45° counterclockwise from the position shown in FIG. 1 in respect to the rotor pole pieces 40 and 42, it will be seen that the poles 22 and 24 will be north, and the poles 26 and 28 will be south, effecting a magnetic attraction for the rotor poles 42 and 40 such as to urge the rotor to move clockwise to a position 45° in advance of the position shown.

Figure 3B:
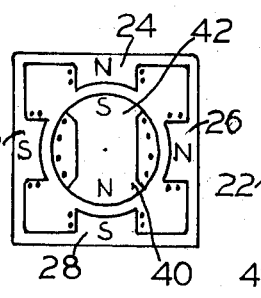
Figure 3C:
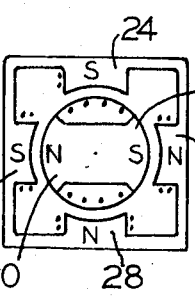
Figure 3D:
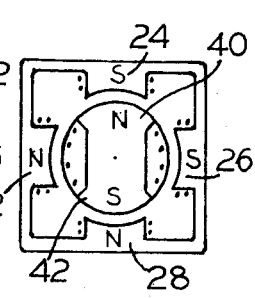

When the rotor advances 45° clockwise from the position shown in FIG. 3A, the field current to coils 30 and 34 is temporarily cut off, and any induced current in such coils resulting from a collapsing field in pole pieces 22 and 26 will be reversed by means of the segments 64 and 66 through the jumper 78. As the magnetic attraction of pole pieces 22 and 26 is momentarily cut off, the poles 42 and 40 of the rotor are attracted to field poles 24 and 28, which are still N and S respectively, and as soon as the rotor moves beyond the 45° point, toward the position shown in FIG. 3B, field poles 22 and 26 are reenergized in the reverse direction and become S and N poles as is indicated in FIG. 3B. This urges the rotor clockwise to the position shown in FIG. 3B, and to a position 45° clockwise beyond that shown in FIG. 3B. Just prior to such position being reached, current from segments 60 and 62 to field coils 32 and 36 is temporarily interrupted, and coils 32 and 36 are momentarily shunted by the intervening segments 64 and 66, and as the rotor moves further, the current from segments 60 and 62 is restored but reversed in coils 32 and 36 to reverse the polarity of the magnetism in pole pieces 24 and 28, such that pole piece 24 is south and pole 28 is north. Thus the magnetic attraction urges the rotor further in a clockwise direction. In a similar fashion, the rotor in progressing 45° beyond the position shown in FIG. 3 results in cutting off the current from segments 60 and 62 in coils 30 and 34 temporarily. Further clockwise movement reverses the current flow in coils 30 and 34 and reverses the polarity of the poles 22 and 26 to N and S respectively. In this manner a single revolution of the rotor is effected.

It will be appreciated that with the commutator switch disposed in relation to the rotor as indicated in FIG. 1, clockwise rotation will also be effected but the torque produced may be somewhat reduced. Varying speeds and torques may be effected by varying the relative angle between the commutator switch relative to the rotor through a range of 45° to either side of the position shown in FIG. 1, either clockwise or counterclockwise, depending on the torque desired.

The apparatus may be simplified by the use of a two pole permanent magnet for the rotor, and if desired the apparatus may act as a generator since the rotating rotor field will cut the conductors of the pole piece coils 30, 32, 34 and 36.

If reverse rotation is desired the connection between a pair of opposed brushes to the corresponding field coils can be effected by a simple double-pole double-throw reversing switch, as will readily be understood, or the commutator switch 58 could be rotated 180° from the position shown in FIG. 1, and thereafter adjusted up to 45° counterclockwise or clockwise with respect to the rotor depending on the torque and speed desired. The limitation as to the adjustment to a range of relative position within 45° to either side of the position shown in FIG. 1 is required since any adjustment beyond such range will produce stall positions, and render the apparatus nonself-starting.

The rotor winding 44, being shown in series with stator windings, is always in the circuit, and thus no short circuit effect can result during the switching due to brushes overlapping two adjacent commutator segments. If desired the commutator segments 60 and 62 can be connected directly to the sliprings and the rotor winding also connected directly, whereby the rotor winding and stator windings will be connected in parallel. When this arrangement is employed, the shunt 78 may be removed, and a resistor 78 in parallel with a capacitor 78 can be connected to the intervening segments 64 and 66, in which case the resistor and capacitor would reduce any tendency to spark, and would quickly absorb the back electromotive force of the stator coils in the interval during which the current flow is about to be reversed.

Referring to FIG. 5, the collector rings of the rotor are connected to rotating brushes 90 and 92, which contact relatively stationary segments 94, 96, 98, 100. Segments 94 and 98 are connected to opposite stator coils 30 and 34, while segments 96 and 100 are connected to opposite stator coils 32 and 36. In this arrangement, only a single pair of stator poles are directly excited at any one time, the brushes successively exciting coils 30 and 34 in one direction, and thereafter exciting coils 32 and 36 in one direction, and thereafter exciting coils 30 and 34 in the reverse direction, following excitation of coils 32 and 36 in the reverse direction. Thus one pair of coils are excited while the other pair are simultaneously disconnected. As shown for example segments 96 and 100 are momentarily disconnected, and segments 94 and 98 are energized.

If desired each pair of the opposed poles may each be provided with a secondary winding, such windings on opposite poles being connected together to effect feed back into the main coils when the main coils are being switched, to stabilize the operation.

Further the rotor may be constructed in the form of a squirrel cage, and the commutator switch may be separately rotated to in effect create a switched rotating field.

It will be seen from FIG. 1 that the end conductors exert magnetic forces in correlation to the internal magnetic forces. Further it will be seen that the switching device is relatively simple employing but two segments, and the rotor has but a single winding.

While the stator is shown as having four poles, for simplicity, it will be understood that additional pairs of poles may be employed, an additional pair of brushes being used for each pair.

While a single form of the invention and variations have been illustrated and described, it is to be understood that the invention is not limited thereto. As various changes in the construction and arrangement may be made without departing from the spirit of the invention, as will be apparent to those skilled in the art, reference will be apparent to those skilled in the art, reference will be had to the appended claims for a definition of the limits of the invention.

What is claimed is:

1. A direct current rotary apparatus, comprising a stator having four inwardly extending poles each having arcuate pole faces concentric with one another, a winding on each of said poles, a rotor having a shaft and two opposed magnetic poles, one always north and the other always south, rotatable within said stator, a commutator switch for the windings of said stator, said switch having two opposed rotatable substantially semicircular arcuate segments mounted on said shaft, two sliprings carried by said rotor and being connected to one and the other of said segments respectively, four relatively stationary brushes angularly spaced uniformly about and contacting the segments, and a first series connection between an opposite pair of brushes and two corresponding windings on opposite pair of brushes and two corresponding windings on opposite stator poles, and a second series connection electrically isolated from and independent of the first series connection between the other pair of brushes and the windings of the other two opposite poles said segments being oriented with respect to the poles of the rotor whereby the stator poles are switched to continually magnetically attract the rotor poles to provide continuous torque in one direction, said commutator switch having short segments between the arcuate segments of a circumferential width greater than the brushes, and a resistor interconnection said short segments.

2. Apparatus as set forth in claim 1 wherein the rotor poles are provided with a winding connected to the sliprings to magnetize the poles.

3. Apparatus as set forth in claim 1 wherein the rotor poles are provided with a winding connected to slip rings to magnetize the poles, and the commutator switch is provided with short segments between the arcuate segments of a circumferential width greater than the brushes, and a resistor interconnecting said short segments.

4. Apparatus as set forth in claim 1 wherein a capacitor is connected across the resistor.

5. Apparatus as set forth in claim 3 wherein a capacitor is connected across the resistor.

6. Apparatus as set forth in claim 1 wherein the rotor poles are provided with a winding, and said winding is connected in series with the sliprings and commutator segments, and wherein said short segments are provided with a shunt.

* * * * *